UNITED STATES PATENT OFFICE.

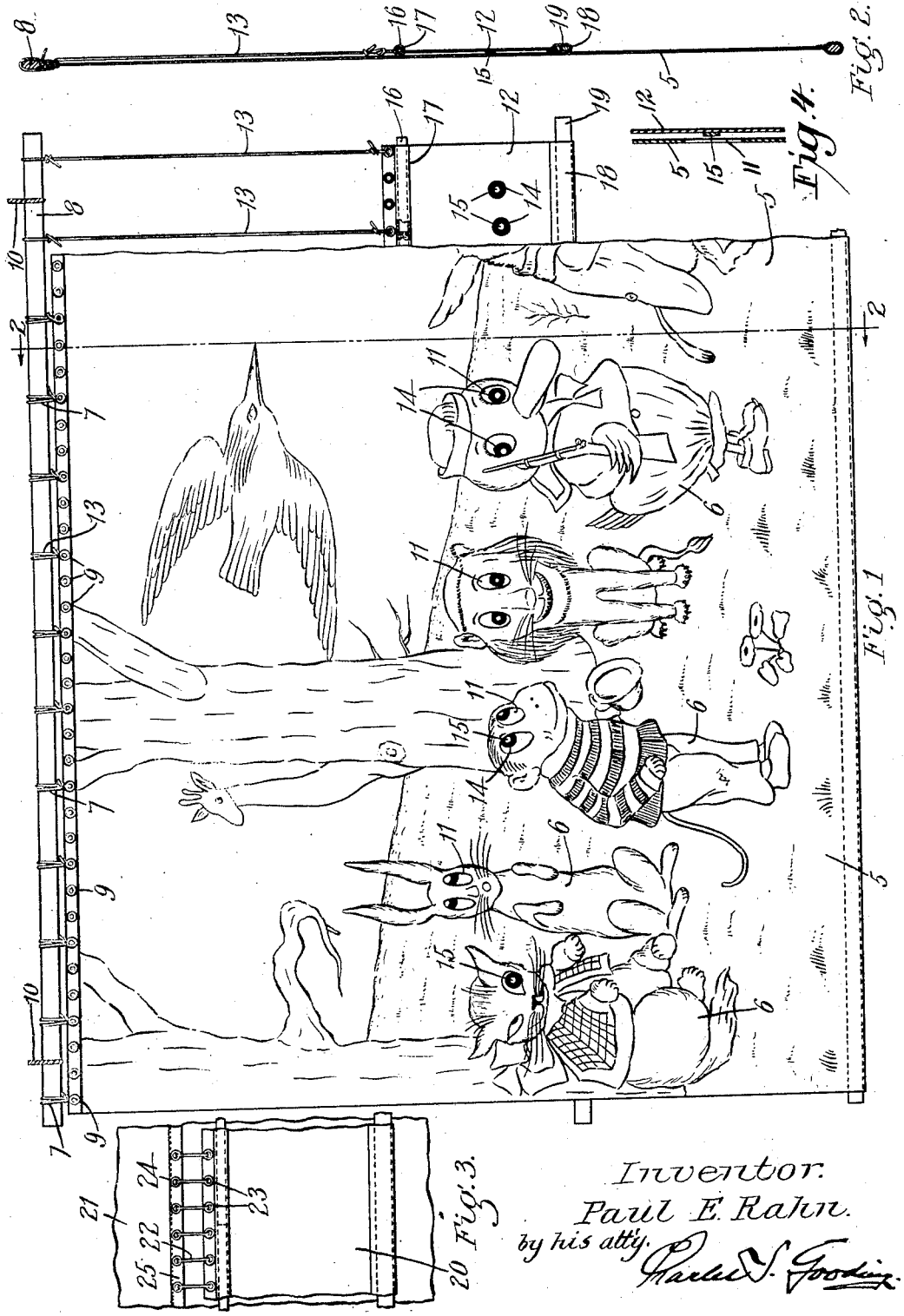

PAUL E. RAHN, OF CHICAGO, ILLINOIS.

THEATER DROP-CURTAIN.

1,358,111. Specification of Letters Patent. Patented Nov. 9, 1920.

Application filed January 5, 1920. Serial No. 349,641.

*To all whom it may concern:*

Be it known that I, PAUL E. RAHN, a citizen of the United States, residing at Chicago, in the county of Cook and State of Illinois, have invented new and useful Improvements in Theater Drop-Curtains, of which the following is a specification.

This invention relates to drop curtains adapted to be used in theaters for stage scenery.

It is the object of the invention to provide a curtain with scenery painted thereon, the said scenery including figures of animals and the like, portions of said figures preferably the eyes of said animals being cut out to form openings through the curtain, the said eyes being attached to or painted upon a movable member adjacent to and in the rear of said curtain and being visible through the openings in said curtain.

It is also an object of the invention to so suspend the movable member that the same may be swung in such a manner as to move the eyes from side to side without moving the curtain, the movement of said eyes being visible through the openings in the curtain.

The invention consists in the combination and arrangement of parts set forth in the following specification and particularly pointed out in the claims thereof.

Referring to the drawings:

Figure 1 is a front elevation of a drop curtain embodying my invention, a portion of said curtain being broken away to clearly illustrate the movable member.

Fig. 2 is a vertical section taken on the line 2—2 of Fig. 1.

Fig. 3 is a rear elevation of a small portion of a drop curtain and movable member and illustrating a modified arrangement of supporting the movable member.

Fig. 4 is a detail vertical section through an eye of one of the figures.

Like numerals refer to like parts throughout the several views of the drawings.

In the drawings, referring particularly to Figs. 1 and 2, 5 represents a curtain the front surface of which has scenery painted thereon, the said scenery including figures 6 representing animals or the like. The upper edge of the curtain 5 is fastened by cords 7 to a batten 8, the said cords extending through eyelets 9 provided in the curtain and over and around said batten. The batten 8 is suspended by ropes 10 and may be raised and lowered in the usual well-known manner.

The figures 6 are preferably of a grotesque character and are provided for the purpose of creating amusement in connection with a song or sketch which is being presented to an audience by actors upon the stage. Portions of the figures 6, preferably the eyes, are cut out thereby forming openings 11 in the curtain 5.

Located in the rear of the curtain 5 and adjacent thereto is a movable member 12 constructed of canvas or the like and suspended by ropes 13 from the batten 8. The ropes 13 furthermore extend through the eyelets 9 which act to correctly position the movable member and prevent the ropes 13 from moving out of position on the batten 8 while operating the movable member. Located upon the movable member 13 in a position to be visible through the openings 11 of the figures 6 are spots 14 constituting eyes, the said spots representing the iris of the eye in the center of which is fastened in any desirable manner a mirror 15 which represents the pupil of the eye. The mirrors 15 are provided for the purpose of reflecting rays of light and thereby giving a brilliancy to said eyes and increasing the effectiveness of the scenery. The movable member 12 is held smooth and flat by a rod 16 constructed preferably in short sections for convenience in transporting, the said sections being screwed together and inserted in a hem 17 provided adjacent to the upper edge of the movable member while the lower edge of said member is provided with a hem 18 in which is inserted a batten 19 which acts as a weight. The movable member may swing from the batten 8 without interfering with or moving the curtain 5.

The operation of my improved drop curtain is as follows: The scenery and decorations upon the curtain are arranged to harmonize with the character of the act which is to be presented. During the presentation of the act by the actors upon the stage at the proper time a stage attendant gently swings the movable member 12, thereby moving the eyes 14 from side to side. This movement of the eyes will be visible to the audience through the openings 11. During this movement the mirrors 15 will reflect any rays of light striking thereagainst and result in producing an extremely novel and amusing effect. It is evident that the scenery appearing upon the curtain may, if it is so desired, include flowers of various varieties such as daisies, sunflowers, pansies, and the like which may be fantastically arranged to represent faces, the eyes of which may be made movable as hereinbefore described without departing from the spirit of this invention.

In Fig. 3 is illustrated a modified embodiment of my invention in which a movable member 20 similar in all respects to the movable member 12, previously described is attached directly to the rear of a curtain 21 and suspended by any suitable device 22 which may be inserted through eyelets 23 and 24 attached respectively to the movable member 20 and a tuck 25 which is formed upon the rear of the curtain 21. This movable member may be swung in a manner similar to the movable member 12 although greater care has to be taken not to move the curtain 21 in so doing.

Having thus described my invention what I claim and desire to secure by Letters Patent is:

1. A curtain, figures thereon representing animate and inanimate objects, portions of said figures being cut out to form openings through said curtain, and a movable member suspended independently of said curtain adjacent to said curtain with spots thereon adapted to register with said openings.

2. A curtain, figures thereon representing animals or the like, portions of said figures being cut out to form openings through said curtain, and a movable member suspended independently of said curtain adjacent to said curtain with portions thereon representing said cut out portions and adapted to register with said openings.

3. A curtain, scenery thereon including figures of animals or the like, the eyes of said animals being cut out to form openings through said curtain, a movable member suspended independently of said curtain adjacent to said curtain, and eyes upon said movable member adapted to register with said openings.

4. A curtain, scenery thereon including figures of animals or the like, the eyes of said animals being cut out to form openings through said curtain, a movable member suspended independently of said curtain in the rear of said curtain and adjacent thereto, and spots constituting eyes upon said movable member adapted to register with said openings.

5. A curtain, scenery thereon including figures of animals or the like, the eyes of said animals being cut out to form openings through said curtain, a movable member suspended in the rear of said curtain and adjacent thereto, spots constituting eyes upon said movable member, and means to reflect rays of light from said eyes.

6. A curtain, scenery thereon including figures of animals or the like, the eyes of said animals being cut out to form openings through said curtain, a movable member suspended in the rear of said curtain and adjacent thereto, spots constituting eyes upon said movable member, and a mirror located upon said spots and adapted to reflect rays of light through said openings.

7. A curtain, scenery thereon including figures of animals or the like, the eyes of said animals being cut out to form openings through said curtain, a batten from which said curtain is hung, a movable member suspended from said batten in the rear of and adjacent to said curtain, and eyes upon said movable member adapted to register with said openings.

8. A curtain, scenery thereon including figures of animals or the like, the eyes of said animals being cut out to form openings through said curtain, a batten from which said curtain is hung, a movable member suspended from said batten in the rear of and adjacent to said curtain, eyes upon said movable member adapted to register with said openings, and means to reflect rays of light from said eyes.

9. A curtain, scenery thereon including figures of animals or the like, the eyes of said animals being cut out to form openings through said curtain, a batten from which said curtain is hung, a movable member suspended from said batten in the rear of and adjacent to said curtain, eyes upon said movable member adapted to register with said openings, means to reflect rays of light from said eyes, and means to stretch said movable member and hold the same smooth and flat during the swinging movement thereof.

In testimony whereof I have hereunto set my hand in presence of two subscribing witnesses.

PAUL E. RAHN.

Witnesses:
FRANKLIN E. LOW,
CATHERINE M. JOYCE.